(12) United States Patent
Nakamura

(10) Patent No.: US 12,517,859 B2
(45) Date of Patent: Jan. 6, 2026

(54) COMMUNICATION DEVICE, RELEASE METHOD OF BUFFER, AND PROGRAM

(71) Applicant: RENESAS ELECTRONICS CORPORATION, Tokyo (JP)

(72) Inventor: Tomoyuki Nakamura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 122 days.

(21) Appl. No.: 18/483,711

(22) Filed: Oct. 10, 2023

(65) Prior Publication Data
US 2024/0168908 A1 May 23, 2024

(30) Foreign Application Priority Data
Nov. 21, 2022 (JP) .................. 2022-185586

(51) Int. Cl.
*G06F 13/42* (2006.01)
*G06F 9/54* (2006.01)

(52) U.S. Cl.
CPC ............. *G06F 13/42* (2013.01); *G06F 9/54* (2013.01)

(58) Field of Classification Search
CPC .................................. G06F 13/42; G06F 9/54
USPC ......................................................... 710/105
See application file for complete search history.

(56) References Cited

U.S. PATENT DOCUMENTS

| | | | | |
|---|---|---|---|---|
| 6,658,493 | B1 * | 12/2003 | Fujioka | G06F 13/4269 710/33 |
| 7,283,549 | B2 * | 10/2007 | Lin | H04L 69/323 370/413 |
| 11,019,182 | B2 | 5/2021 | Mardmoeller et al. | |
| 2016/0117106 | A1 * | 4/2016 | Ihara | G06F 3/0673 711/156 |
| 2016/0162199 | A1 * | 6/2016 | Tang | G06F 13/4282 711/153 |
| 2016/0313921 | A1 * | 10/2016 | Kojima | G06F 12/0246 |
| 2023/0116328 | A1 * | 4/2023 | Gopal | H04L 12/4625 370/257 |
| 2023/0137668 | A1 * | 5/2023 | Li | G06F 3/0644 711/103 |
| 2023/0236822 | A1 * | 7/2023 | Liu | B60R 16/0231 |
| 2023/0415675 | A1 * | 12/2023 | Kinoshita | B60R 16/02 |
| 2024/0134679 | A1 * | 4/2024 | Furuto | G06F 9/54 |

FOREIGN PATENT DOCUMENTS

JP 2019-506094 A 2/2019

* cited by examiner

*Primary Examiner* — Christopher B Shin
(74) *Attorney, Agent, or Firm* — Rimon P.C.

(57) ABSTRACT

A communication device includes at least one memory and at least one processor coupled to the at least one memory. The at least one processor is configured to: secure a transmission buffer that is not optionally released by a user application; monitor a storage area in which a specific field in an upper protocol header included in payload data of a frame transmitted from the transmission buffer is written; and release the transmission buffer in a case where a storage value stored in the storage area has not been updated for a certain period of time.

10 Claims, 9 Drawing Sheets

COMMUNICATION DEVICE, RELEASE METHOD OF BUFFER, AND PROGRAM

CROSS-REFERENCE TO RELATED APPLICATIONS

The disclosure of Japanese Patent Application No. 2022-185586 filed on Nov. 21, 2022 including the specification, drawings and abstract is incorporated herein by reference in its entirety.

BACKGROUND

The present invention relates to a communication device, a release method of a buffer, and a program.

There is disclosed a technique listed below.
[Patent Document 1] Japanese Unexamined Patent Application Publication No. 2019-506094

In recent years, development of a gateway electronic control unit (ECU) using Ethernet technology has been desired. Ethernet is a registered trademark, but description thereof will be omitted in the following description. The gateway ECU serves as a control tower that controls the operations of a plurality of ECUs. A routing technique for performing control communication from a plurality of communication ports is required for the gateway ECU. Patent Document 1 discloses an example of a gateway ECU using the Ethernet technology.

As a standard that defines a software structure of an in-vehicle device, there is an automotive open system architecture (AUTOSAR). AUTOSAR is a registered trademark, but description thereof will be omitted in the following description. When routing is performed according to AUTOSAR, an Ethernet driver and an Ethernet switch are used in combination. The Ethernet driver and the Ethernet switch are software modules defined in AUTOSAR. The Ethernet switch has a routing function, and the Ethernet driver has a function of transmitting an Ethernet frame. Before transmitting an Ethernet frame, a user application calls an application programming interface (API), and the Ethernet driver secures a transmission buffer.

SUMMARY

In the AUTOSAR architecture, no API for optionally releasing the transmission buffer is present. Therefore, when the situation changes and the transmission buffer becomes unnecessary, there is a problem in that an unnecessary frame needs to be transmitted to release the transmission buffer.

Other problems and novel features will become apparent from the description of the present specification and the accompanying drawings.

According to an embodiment, a communication device includes a memory and a processor coupled to the memory. The processor secures a transmission buffer that is not optionally released by a user application. In addition, the processor monitors a storage area in which a specific field in an upper protocol header included in payload data of a frame transmitted from the transmission buffer is written, and releases the transmission buffer in a case where a storage value stored in the storage area has not been updated for a certain period of time.

According to an embodiment, a release method of a buffer by a computer includes securing a transmission buffer that is not optionally released by a user application. In addition, the release method of a buffer includes monitoring a storage area in which a specific field in an upper protocol header included in payload data of a frame transmitted from the transmission buffer is written, and releasing the transmission buffer in a case where a storage value stored in the storage area has not been updated for a certain period of time.

According to an embodiment, a program causes a computer to execute a process of securing a transmission buffer that is not optionally released by a user application. In addition, the program further causes the computer to execute a process of monitoring a storage area in which a specific field in an upper protocol header included in payload data of a frame transmitted from the transmission buffer is written, and a process of releasing the transmission buffer in a case where a storage value stored in the storage area has not been updated for a certain period of time.

According to the embodiment, the transmission buffer, which is not optionally released by the user application, can be released without transmitting an unnecessary frame.

DETAILED DESCRIPTION

Figure 1:
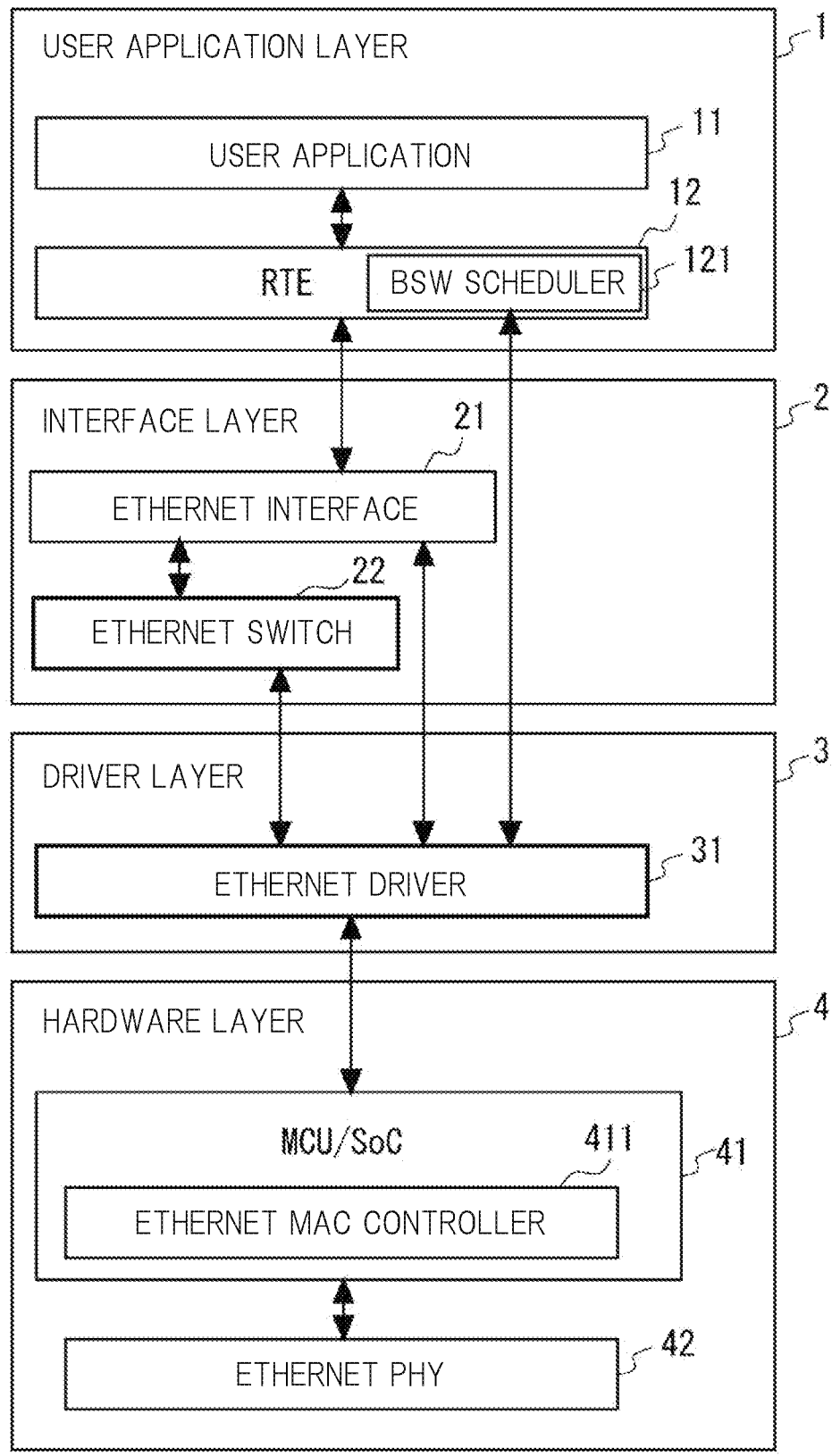
FIG. 1 is a diagram for explaining an outline of an architecture of AUTOSAR Ethernet.

For clarity of description, the following description and drawings are omitted and simplified as appropriate. In addition, each element described in the drawings as a functional block that performs various processes can be configured by a central processing unit (CPU), a memory, and other circuits in terms of hardware, and is implemented by a program loaded in the memory or the like in terms of software. Therefore, it is understood by those skilled in the art that these functional blocks can be implemented in various forms by only hardware, only software, or a combination thereof, and the implementation is not limited to any of them. Note that, in the drawings, the same elements are denoted by the same reference numerals, and redundant description is omitted as necessary.

In addition, the above-described program includes an instruction group (or software code) for causing a computer to perform one or more functions described in the embodiment when the program is read by the computer. The program may be stored in a non-transitory computer-readable medium or a tangible storage medium. By way of example, and not limitation, a computer-readable medium or a tangible storage medium includes a random access memory (RAM), a read only memory (ROM), a flash memory, a solid state drive (SSD) or other memory technology, a CD-ROM, a digital versatile disc (DVD), a Blu-ray (registered trademark) disc or other optical disk storage, a magnetic cassette, a magnetic tape, a magnetic disk storage or other magnetic storage devices. The program may be transmitted on a transitory computer readable medium or a communication medium. By way of example, and not limitation, a transitory computer-readable medium or a communication medium includes electrical, optical, acoustic, or other forms of propagated signals.

Circumstances Leading to Embodiments

First, problems studied by the inventors will be described in detail with reference to FIGS. 1 and 2. FIG. 1 is a diagram for explaining an outline of an architecture of AUTOSAR Ethernet. The AUTOSAR Ethernet is an architecture for transmitting and receiving Ethernet frames conforming to the AUTOSAR standard.

The architecture of the AUTOSAR Ethernet includes a user application layer 1, an interface layer 2, a driver layer 3, and a hardware layer 4.

The user application layer 1 includes a user application 11 and a runtime environment (RTE) 12. The RTE 12 includes a basic software (BSW) scheduler 121.

The interface layer 2 includes an Ethernet interface 21 and an Ethernet switch 22.

The driver layer 3 includes an Ethernet driver 31.

The hardware layer 4 includes a micro controller unit (MCU)/system on a chip (SoC) 41 and an Ethernet physical layer (PHY) 42. The MCU/SoC 41 includes an Ethernet media access control (MAC) controller 411.

The user application 11 is coupled to the RTE 12. The RTE 12 is coupled to the user application 11 and the Ethernet interface 21. The BSW scheduler 121 is coupled to the Ethernet driver 31.

The Ethernet interface 21 is coupled to the RTE 12, the Ethernet switch 22, and the Ethernet driver 31. The Ethernet switch 22 is coupled to the Ethernet interface 21 and the Ethernet driver 31.

The Ethernet driver 31 is coupled to the BSW scheduler 121, the Ethernet interface 21, the Ethernet switch 22, and the MCU/SoC 41.

The MCU/SoC 41 is coupled to the Ethernet driver 31 and the Ethernet PHY 42. The Ethernet PHY 42 is coupled to the MCU/SoC 41.

As described above, the architecture of the AUTOSAR Ethernet includes the Ethernet interface 21 and the Ethernet driver 31, which is a lower layer of the Ethernet interface 21. A routing technology can be implemented by combining the Ethernet interface 21 and the Ethernet driver 31.

Figure 2:
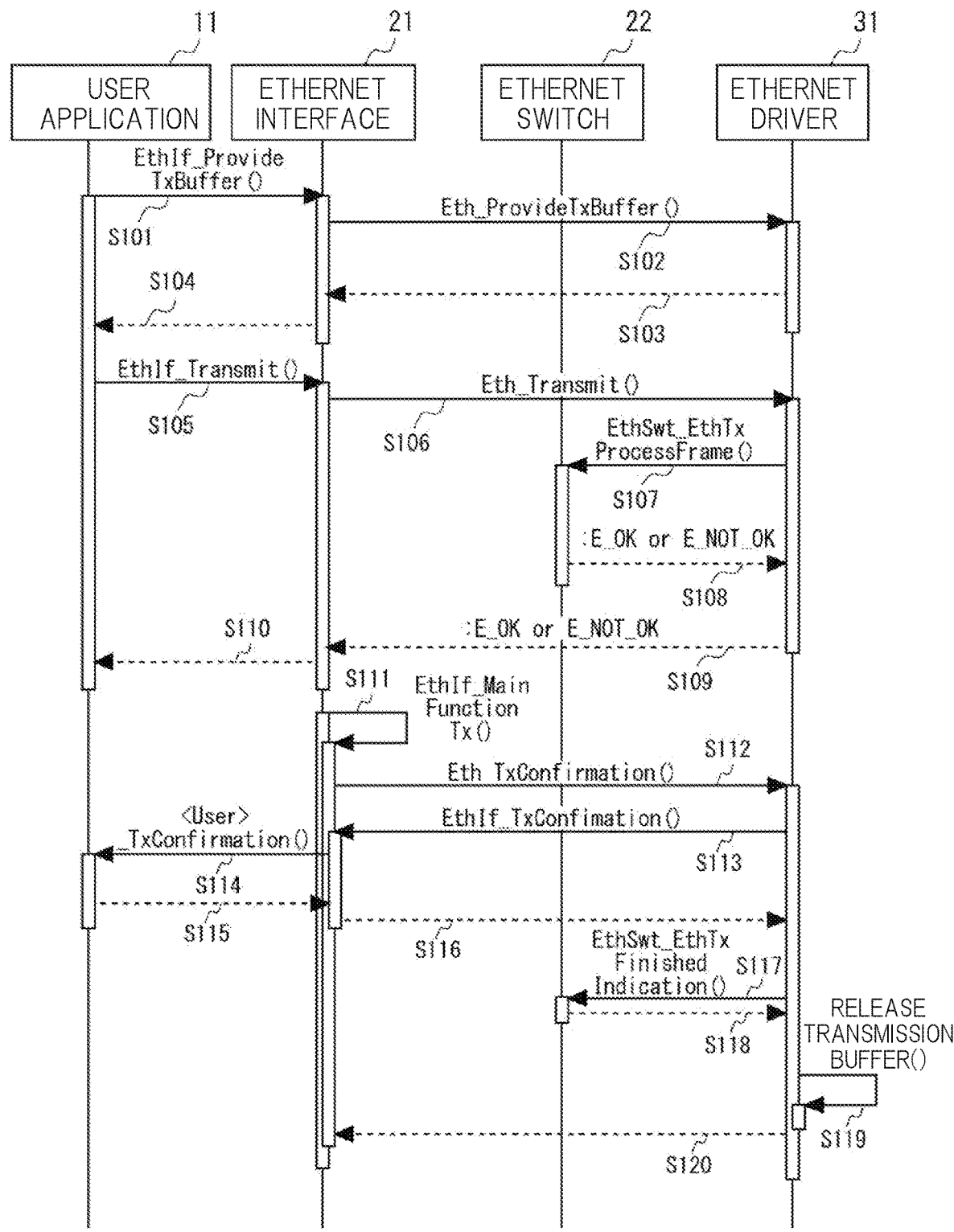
FIG. 2 is a diagram for explaining a transmission operation conforming to the AUTOSAR standard.

FIG. 2 is a diagram for explaining a transmission operation conforming to the AUTOSAR standard. First, the user application 11 calls an API called EthIf_ProvideTxBuffer( ) (step S101). As a result, securing a transmission buffer is requested from the user application 11 to the Ethernet interface 21. Next, the Ethernet interface 21 calls an API called Eth_ProvideTxBuffer( ) (step S102). As a result, the request is transferred from the Ethernet interface 21 to the Ethernet driver 31, and the transmission buffer is secured. Next, the call in step S102 ends (step S103), and the call in step S101 ends (step S104).

Next, the user application 11 writes data to the secured transmission buffer and calls EthIf_Transmit( ) (step S105). The user application 11 requests the Ethernet interface 21 to transmit the data written to the transmission buffer. Next, the Ethernet interface 21 calls Eth_Transmit( ) (step S106). As a result, the request is transferred from the Ethernet interface 21 to the Ethernet driver 31.

Next, the Ethernet driver 31 calls EthSwt_EthTxProcessFrame( ) (step S107). The Ethernet switch 22 determines whether a frame needs to be transmitted, and returns "E_OK" when a frame needs to be transmitted, and returns "E_NOT_OK" when a frame does not need to be transmitted (step S108). In related art, the Ethernet driver 31 transmits a frame both in the case of "E_OK" and in the case of "E_NOT_OK". Next, the Ethernet driver 31 returns "E_OK" or "E_NOT_OK" in response to the call in step S106 (step S109). Next, the call in step S105 ends (step S110).

Next, the Ethernet interface 21 calls EthIf_MainFunctionTx( ) (step S111). In response to step S111, the Ethernet interface 21 calls Eth_TxConfirmation( ) (step S112). This triggers confirmation of the transmission of the frame. Next, the Ethernet driver 31 calls EthIf_TxConfirmation( ) (step S113). As a result, the transmission completion notification is transmitted from the Ethernet driver 31 to the Ethernet interface 21. Next, the Ethernet interface 21 calls <User>_TxConfirmation( ) (step S114). As a result, the transmission completion notification is transferred from the Ethernet interface 21 to the user application 11. Next, the call in step S114 ends (step S115), and the call in step S113 ends (step S116).

Next, the Ethernet driver 31 calls EthSwt_EthTxFinishedIndication( ) (step S117). This indicates to the Ethernet switch 22 that the transmission of the frame has been completed. Next, the call in step S117 ends (step S118).

Next, the Ethernet driver 31 releases the transmission buffer (step S119). Finally, the call in step S112 ends (step S120).

In this way, in the frame transmission process conforming to the AUTOSAR standard, the transmission buffer is released after the transmission of the frame.

In the AUTOSAR standard, no API that releases the transmission buffer without transmitting a frame is present. Therefore, even when transmitting a frame is not needed due to a situation change of the user application 11, it is necessary to transmit an unnecessary frame to release the transmission buffer. In this case, there is a problem in that the network bandwidth is compressed by transmitting an unnecessary frame. In addition, there is a problem in that latency occurs, thereby adversely affecting a user application for which a real-time property is required.

For example, after a transmission buffer of a certain size is secured, a transmission buffer of a larger size may be required due to a situation change. In this case, the secured transmission buffer becomes unnecessary. However, unless a frame is transmitted, the secured transmission buffer cannot be released.

In addition, the conventional Ethernet driver 31 transmits a frame both when receiving "E_OK" and when receiving "E_NOT_OK.". This is because the transmission buffer cannot be released unless a frame is transmitted, and thus memory leakage occurs. Therefore, it is not possible to meet a need for determining whether or not to transmit a frame after the transmission buffer is secured.

The inventors of the present application have conceived an embodiment on the basis of the above examination. Hereinafter, embodiments will be described.

First Embodiment

Figure 3:
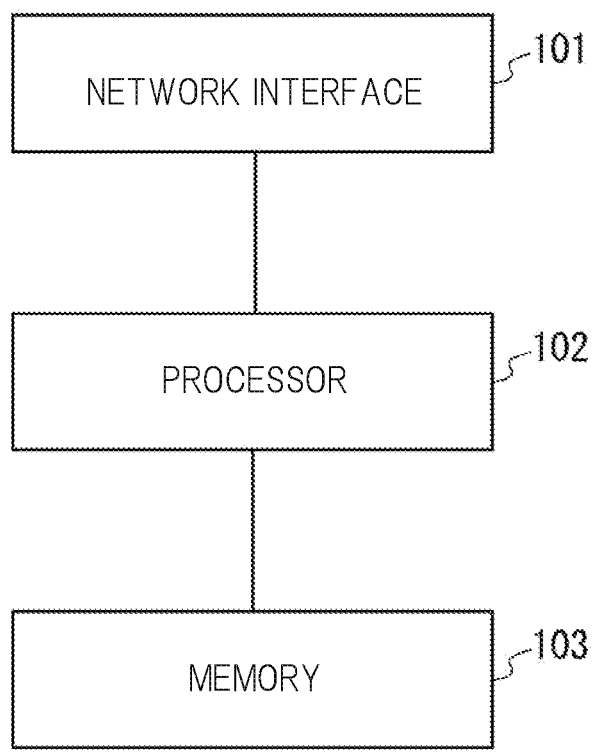
FIG. 3 is a diagram for explaining a configuration example of a communication device according to a first embodiment.

FIG. 3 is a diagram for explaining a configuration example of a communication device 100 according to a first embodiment. The communication device 100 may be a gateway ECU that mediates communication between a plurality of ECUs.

The communication device 100 includes a network interface 101, a processor 102, and a memory 103. The network interface 101 is used to communicate with other communication devices (for example: ECU). The network interface 101 may include, for example, a network interface card (NIC).

The processor 102 may be, for example, a microprocessor, a micro processing unit (MPU), or a CPU. The processor 102 may include a plurality of processors.

The memory 103 includes a volatile memory and a nonvolatile memory. The memory 103 may include a plurality of physically independent memory devices. The volatile memory is, for example, a static RAM (SRAM) or a dynamic RAM (DRAM), an electrically erasable programmable ROM (EEPROM), a flash memory, or a hard disk drive, or any combination thereof. The memory 103 may include a storage disposed away from the processor 102. In this case, the processor 102 may access the memory 103 via the network interface 101 or an input/output (I/O) interface (not illustrated).

The memory 103 may store one or more software modules (computer programs) including an instruction group and data for performing processing by the communication device 100. In some implementations, the processor 102 may be configured to perform processing of the communication device 100 by reading and executing the software module from the memory 103.

Figure 4:
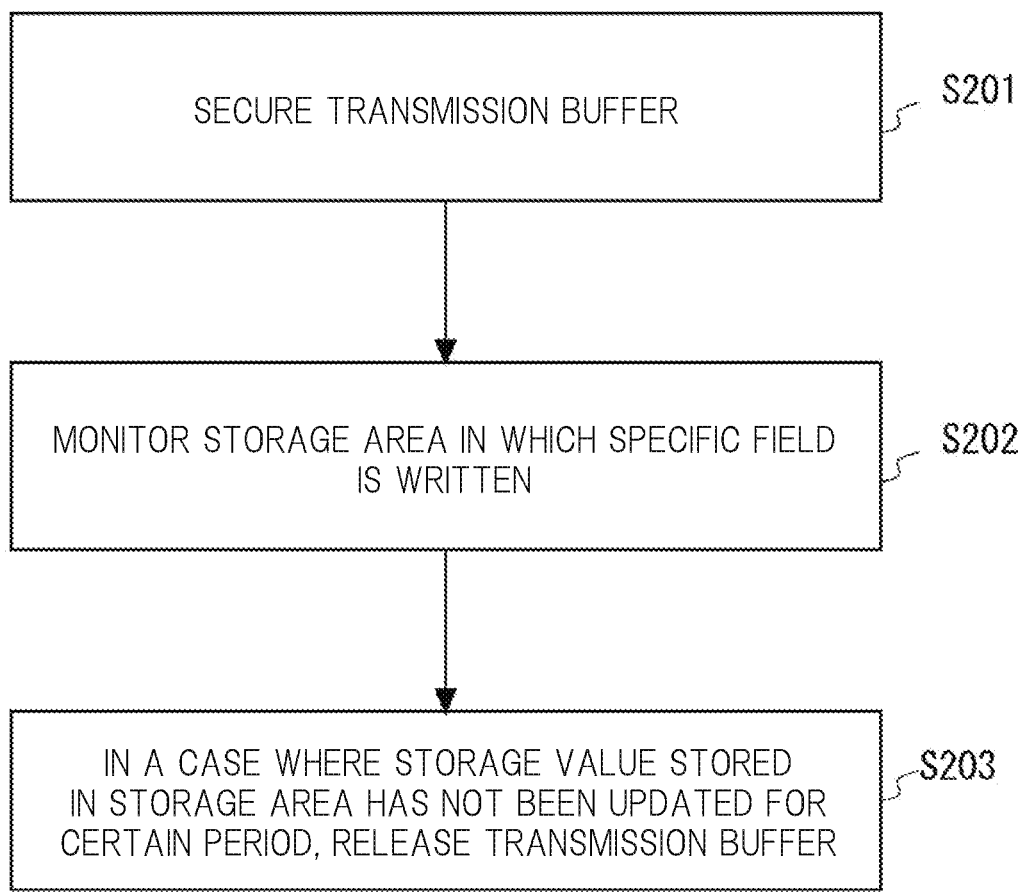
FIG. 4 is a diagram for explaining an outline of an operation of the communication device according to the first embodiment.

FIG. 4 is a diagram for explaining an outline of an operation of the communication device 100. In step S201, the processor 102 secures a transmission buffer that is not optionally released by the user application 11. Step S201 may be performed according to step S102 in FIG. 2.

In step S202, the processor 102 monitors a storage area in which a specific field in an upper protocol header included in payload data of a frame transmitted from the transmission buffer is written. The storage area is also referred to as a monitoring area. The upper protocol is an upper protocol than the data link layer to which the Ethernet belongs. The upper protocol is, for example, IP belonging to the network layer or TCP and UDP belonging to the transport layer.

The specific field may be, for example, any of a field indicating a protocol number in the IP header, a field indicating a header checksum in the IP header, and a field indicating a checksum in the TCP header. The specific field may be either a field indicating a checksum in the UDP header or a field indicating a checksum in the ICMP header. Since these specific fields are fields that are always updated before a frame is transmitted, it is possible to appropriately determine whether or not the user application 11 transmits a frame by monitoring these specific fields. In particular, the fields indicating the header checksum and the checksum are fields that are updated immediately before transmission. By monitoring these specific fields, it is possible to more accurately determine whether the user application 11 transmits a frame.

The processor 102 may monitor a storage area in which a plurality of the specific fields are written. The occurrence of malfunction can be prevented by monitoring a plurality of the storage areas.

In a case where the entire storage area in which the protocol header is written is monitored, overheads are large. Therefore, the processor 102 monitors the storage area in which the specific field in the protocol header is written.

In step S203, in a case where a storage value stored in the storage area has not been updated for a certain period, the processor 102 releases the transmission buffer. The processor 102 can automatically release a transmission buffer that is determined to be unused.

Figure 5:
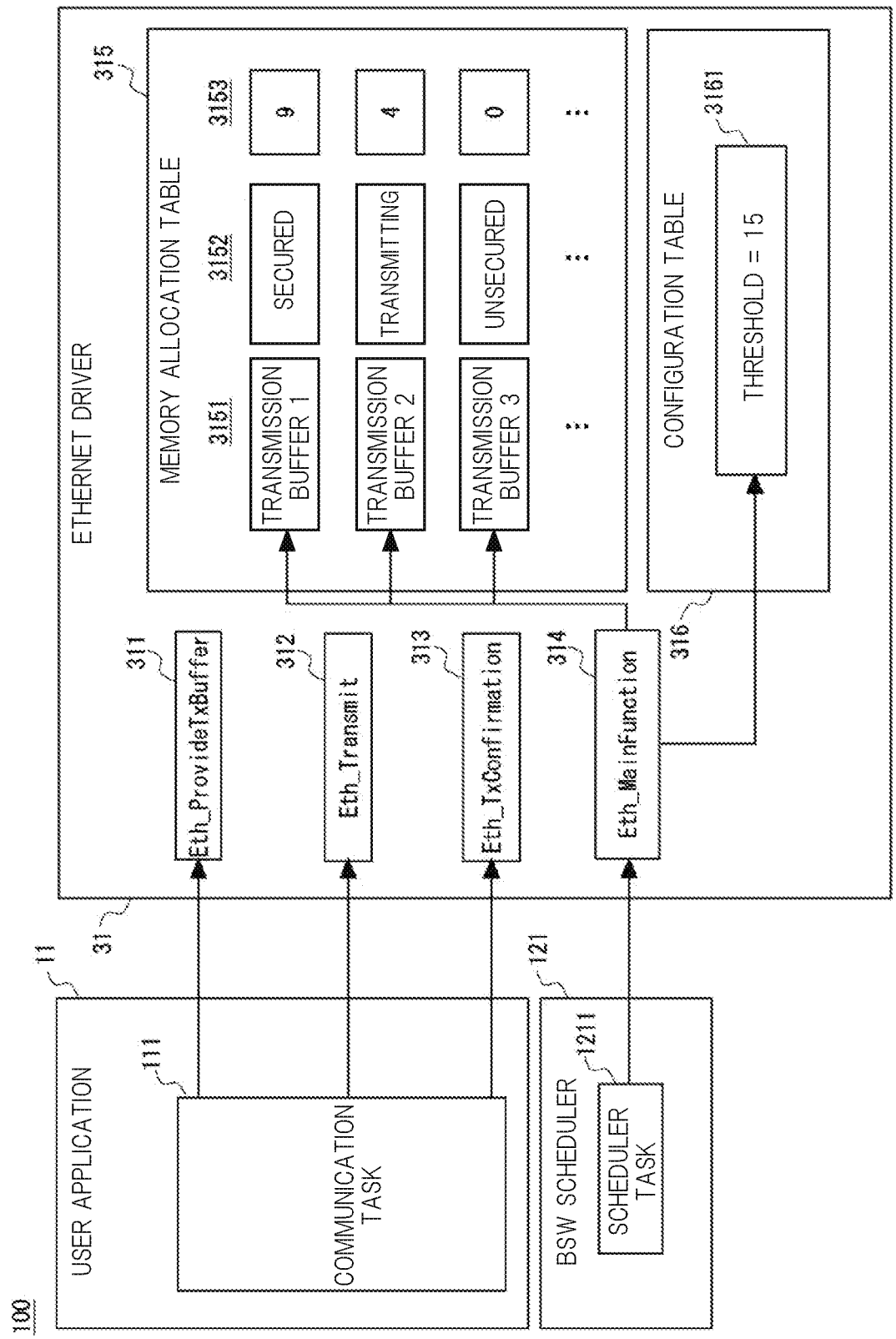
FIG. 5 is a diagram for explaining a functional configuration of the communication device according to the first embodiment.

FIG. 5 is a diagram for explaining a functional configuration of the communication device 100 according to the first embodiment. Each function may be implemented by causing the processor 102 described above to read a program into the memory 103 and execute the program.

The communication device 100 includes a user application 11, a BSW scheduler 121, and an Ethernet driver 31.

The user application includes a communication task 111. The communication task 111 makes a request for securing a transmission buffer, a request for transmitting a frame, and a request for releasing a transmission buffer in which a frame has been transmitted.

The BSW scheduler 121 includes a scheduler task 1211. The scheduler task 1211 causes the Ethernet driver 31 to periodically (for example: n second period) monitor whether the monitoring area has been updated.

Eth_ProvideTxBuffer 311, Eth_Transmit 312, Eth_TxConfirmation 313, and Eth_MainFunction 314 are APIs that cause the Ethernet driver 31 to execute the processing.

The Ethernet driver 31 manages a memory allocation table 315 and a configuration table 316.

The memory allocation table 315 is a table for managing the usage status of the transmission buffer. The memory allocation table 315 stores an identifier 3151, a status 3152, and a counter value 3153 of the transmission buffer in association with each other.

The identifier 3151 may be a numerical value such as 1, 2, or 3, or may be the start memory address of the transmission buffer. The status 3152 is one of "secured", "transmitting", and "unsecured". "secured" is also referred to as "issued", and "unsecured" is also referred to as "unissued". In a case where the transmission buffer has been secured and the frame written in the transmission buffer has not been transmitted, the status 3152 is "secured". When the frame written in the transmission buffer is being transmitted, the status 3152 is "transmitting". In a case where the transmission buffer has not been secured yet, the status 3152 is "unsecured". The counter value 3153 is a numerical value (for example: 9, 4, 0) representing a period during which the storage value stored in the monitoring area has not been updated. The counter value 3153 is also referred to as a timer counter value.

The configuration table 316 stores a threshold 3161 representing a reference for releasing the transmission buffer. The threshold 3161 is, for example, 15. The threshold 3161 may be set to an appropriate value by the user application 11.

When the communication task 111 requests to secure a transmission buffer, Eth_ProvideTxBuffer 311 is called. The Ethernet driver 31 sets the status 3152 of the secured transmission buffer to "secured".

When the communication task 111 requests to transmit a frame, Eth_Transmit 312 is called. The Ethernet driver 31 sets the status 3152 of the transmission buffer in which the frame has been transmitted to "transmitting".

When the communication task 111 requests to release the transmission buffer in which the frame has been transmitted, Eth_TxConfirmation is called. The Ethernet driver 31 sets the status 3152 of the released transmission buffer to "unsecured".

The scheduler task 1211 calls Eth_MainFunction 314 periodically (for example: n second period). The Ethernet driver 31 executes a process of monitoring the transmission buffer and a process of releasing the transmission buffer on the basis of the counter value 3153.

First, a process of monitoring the transmission buffer will be described. The Ethernet driver 31 monitors the update status of the transmission buffer in which the status 3152 is "secured". The Ethernet driver 31 monitors a storage area (monitoring area) in which a specific field (for example: checksum) in an upper protocol header is written. Specifically, the Ethernet driver 31 periodically monitors whether the storage value stored in the monitoring area has been updated. In a case where the storage value has been updated, the Ethernet driver 31 resets the counter value 3153 to zero. In a case where the storage value has not been updated, the Ethernet driver 31 increases the counter value 3153 by a certain amount (for example, one).

Next, a process of releasing the transmission buffer will be described. The Ethernet driver 31 determines whether the counter value 3153 of each transmission buffer is greater than or equal to the threshold 3161. When the counter value 3153 is greater than or equal to the threshold 3161, the Ethernet driver 31 releases the transmission buffer.

Figure 6:
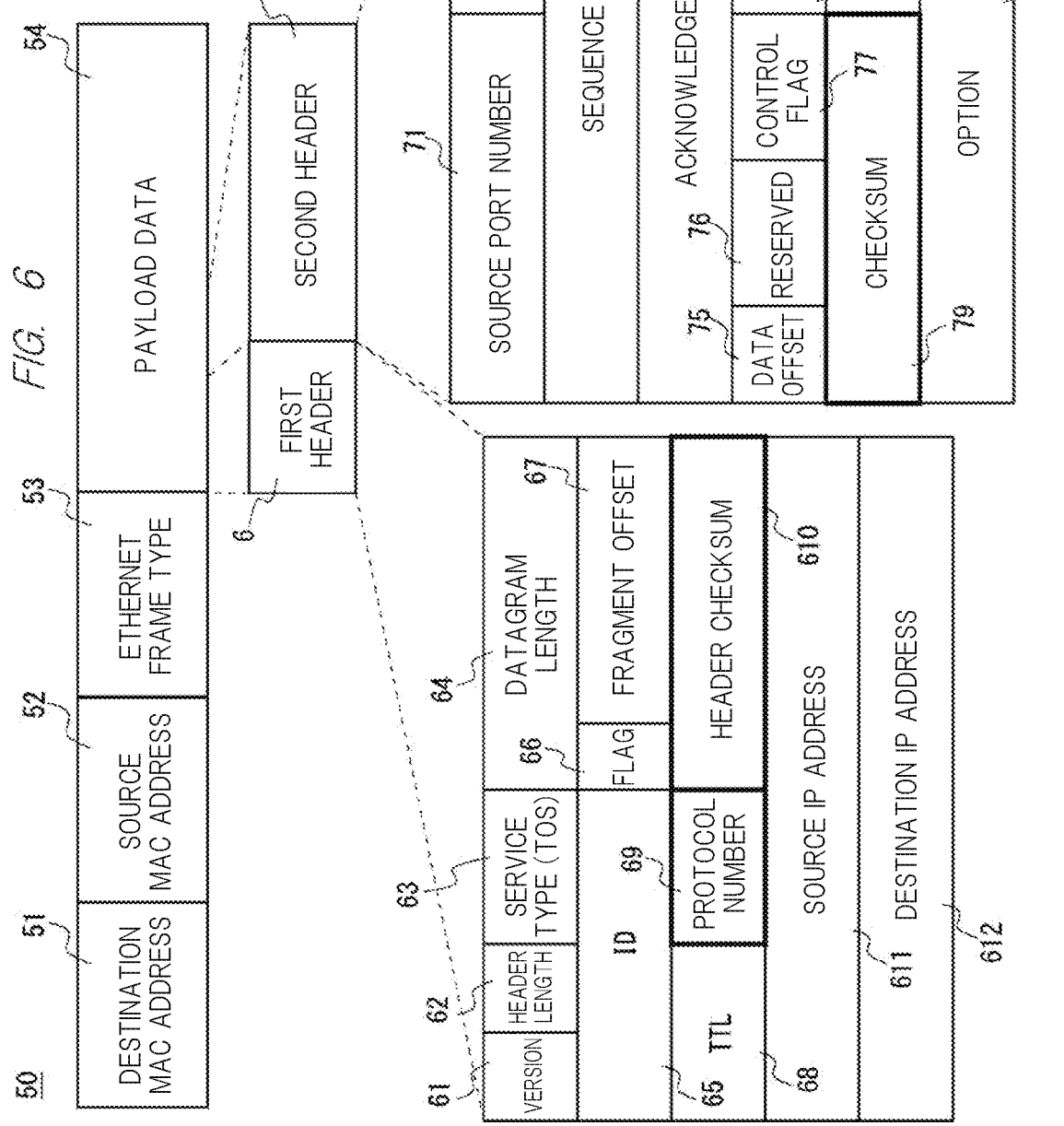
FIG. 6 is a diagram for explaining a format of a frame stored in a transmission buffer.

FIG. 6 is a diagram for explaining a format of a frame 50 stored in a transmission buffer. The transmission buffer is secured by the above-described Eth_ProvideTxBuffer 311.

The frame 50 includes a destination MAC address 51, a source MAC address 52, an Ethernet frame type 53, and payload data 54. The size of the destination MAC address 51 is 6 bytes. The size of the source MAC address 52 is 6 bytes. The size of the Ethernet frame type 53 is 2 bytes. The size of the payload data 54 is 46 to 1500 bytes.

The destination MAC address 51 and the source MAC address 52 are written by the Ethernet driver 31. The payload data 54 is written by the user application 11.

The payload data 54 includes a first header 6 and a second header 7. The first header 6 and the second header 7 are the upper protocol headers described above. The first header 6 is an IP header. The second header 7 is a TCP header, a UDP header, or an ICMP header. Hereinafter, a case where the second header 7 is a TCP header will be mainly described. The size of the first header 6 is 20 bytes. The size of the second header 7 is 8 bytes or 20 bytes.

The first header 6 includes version 61, header length 62, service type (TOS) 63, datagram length 64, ID 65, flag 66, and fragment offset 67. The first header 6 includes a time to live (TTL) 68, a protocol number 69, a header checksum 610, a source IP address 611, and a destination IP address 612.

The second header 7 includes a source port number 71, a destination port number 72, a sequence number 73, and an acknowledgement number 74. The second header 7 includes a data offset 75, a reserved 76, a control flag 77, a window size 78, a checksum 79, an emergency pointer 710, an option 711, and a padding 712.

The Ethernet driver 31 monitors a storage area in which the protocol number 69 is written, a storage area in which the header checksum 610 is written, and a storage area in which the checksum 79 is written. In a case where the storage value stored in any storage area has not been updated for a certain period of time, the Ethernet driver 31 can release the transmission buffer.

Figure 7:
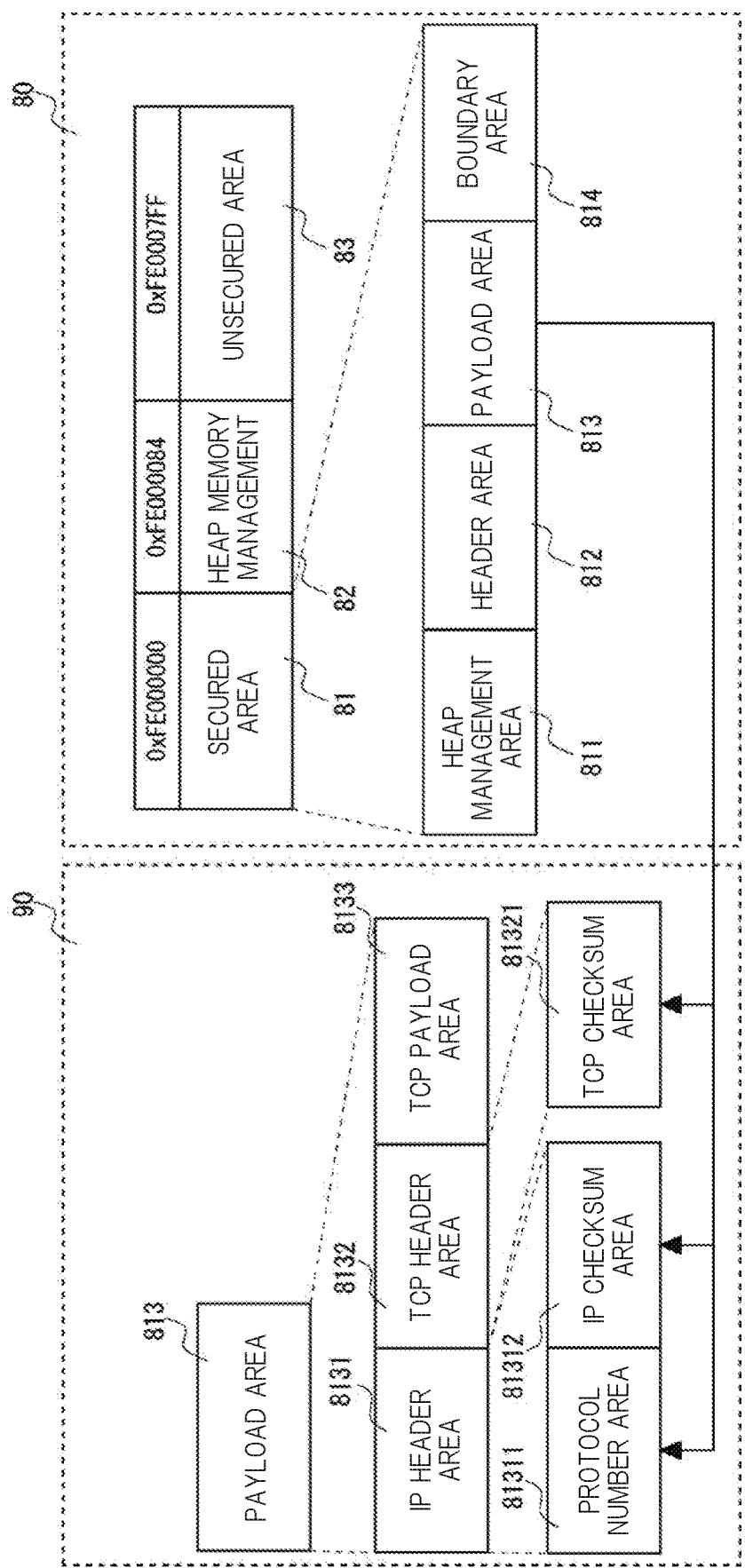
FIG. 7 is a diagram for explaining a monitoring operation by an Ethernet driver.

Next, a monitoring operation by the Ethernet driver 31 will be describe with reference to FIG. 7. A storage area 80 represents a storage area viewed from the Ethernet driver 31 side. A storage area 90 represents a storage area viewed from the user application 11 side.

It is assumed that the Ethernet driver 31 secures a secured area 81 of 132 bytes in which the start address starts from 0xFE000000. The start address of a heap memory management 82 is 0xFE000084, and the size of the heap memory management 82 is 16 bytes. The start address of an unsecured area 83 is 0xFE0007FF, and the size of the unsecured area 83 is 1900 bytes.

The secured area 81 includes a heap management area 811, a header area 812, a payload area 813, and a boundary area 814.

Management information is written in the heap management area 811. The start address of the heap management area 811 is 0xFE000000, and the size of the heap management area 811 is 16 bytes.

In the header area 812, the destination MAC address 51, the source MAC address 52, and the Ethernet frame type 53 are written. The start address of the header area 812 is 0xFE000010, and the size of the header area 812 is 14 bytes.

The payload data 54 is written in the payload area 813. The start address of the payload area 813 is 0xFE00001E, and the size of the payload area 813 is 100 bytes.

The boundary area 814 is located at a boundary with the heap memory management 82. The start address of the boundary area 814 is 0xFE000082, and the size of the boundary area 814 is 2 bytes.

On the other hand, the storage area 90 viewed from the user application 11 includes the payload area 813. A frame is written in the payload area 813. The payload area 813 corresponds to a transmission buffer.

The payload area 813 includes an IP header area 8131, a TCP header area 8132, and a TCP payload area 8133. Note that a UDP header and a UDP payload may be written in the payload area 813 instead of the TCP header and the TCP payload. An ICMP header and an ICMP payload may be written.

The first header 6 is written in the IP header area 8131. The start address of the IP header area 8131 is 0xFE00001E, and the size of the IP header area 8131 is 20 bytes.

The second header 7 is written in the TCP header area 8132. The start address of the TCP header area 8132 is 0xFE000032, and the size of the TCP header area 8132 is 20 bytes.

A TCP payload is written in the TCP payload area 8133. The TCP payload is data other than the first header 6 and the second header 7 of the payload data 54. The start address of the TCP payload area 8133 is 0xFE000046, and the size of the TCP payload area 8133 is 60 bytes.

The IP header area 8131 includes a protocol number area 81311 and an IP checksum area 81312.

The protocol number 69 is written in the protocol number area 81311. The start address of the protocol number area 81311 is 0xFE000028, and the size of the protocol number area 81311 is 1 byte.

The header checksum 610 is written in the IP checksum area 81312. The start address of the IP checksum area 81312 is 0xFE000029, and the size of the IP checksum area 81312 is 2 bytes.

The TCP header area 8132 includes a TCP checksum area 81321.

The checksum 79 is written in the TCP checksum area 81321. The start address of the TCP checksum area 81321 is 0xFE000042, and the size of the TCP checksum area 81321 is 2 bytes.

The Ethernet driver 31 monitors the protocol number area 81311, the IP checksum area 81312, and the TCP checksum area 81321. Since the start address and the size of each area are known, the Ethernet driver 31 can monitor each monitoring area. In a case where any of the monitoring areas has been updated, the Ethernet driver 31 resets the counter value 3153. When the counter value 3153 reaches the threshold, the Ethernet driver 31 determines that the transmission buffer has been abandoned and releases the transmission buffer.

Figure 8:
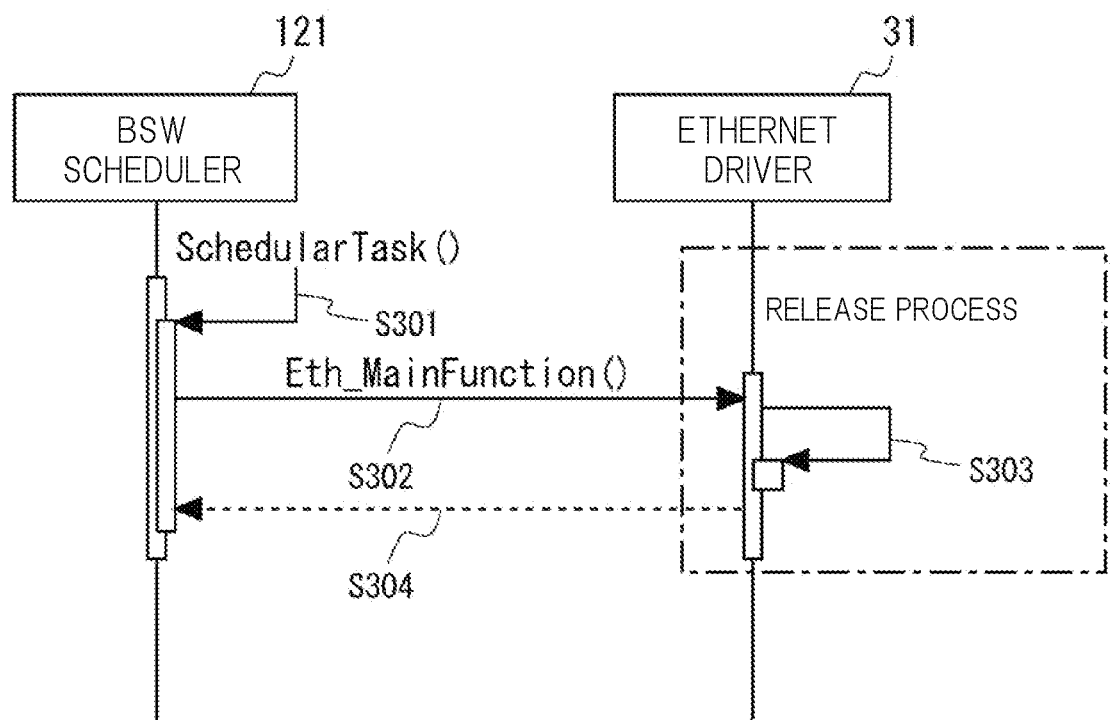
FIG. 8 is a sequence diagram for explaining an operation of the Ethernet driver according to the first embodiment.

FIG. 8 is a sequence diagram for explaining an operation of the Ethernet driver according to the first embodiment. The operation sequence of the communication device 100 includes the sequence illustrated in FIG. 8 in addition to the sequence illustrated in FIG. 2.

It is assumed that the transmission buffer is secured in steps S101 to S104 in FIG. 2. Then, it is assumed that writing to the transmission buffer has not been performed.

SchdulerTask( ) is called (step S301) and the scheduled function operates. The BSW scheduler 121 calls Eth_MainFunction( ) in one second period (step S302).

In response to step S302, the Ethernet driver 31 executes a release process of the transmission buffer (step S303). A detailed flow of the release process will be described later. The Ethernet driver 31 determines whether or not to release all the secured transmission buffers and performs the release process. Then, the call in step S302 ends (step S304).

Figure 9:
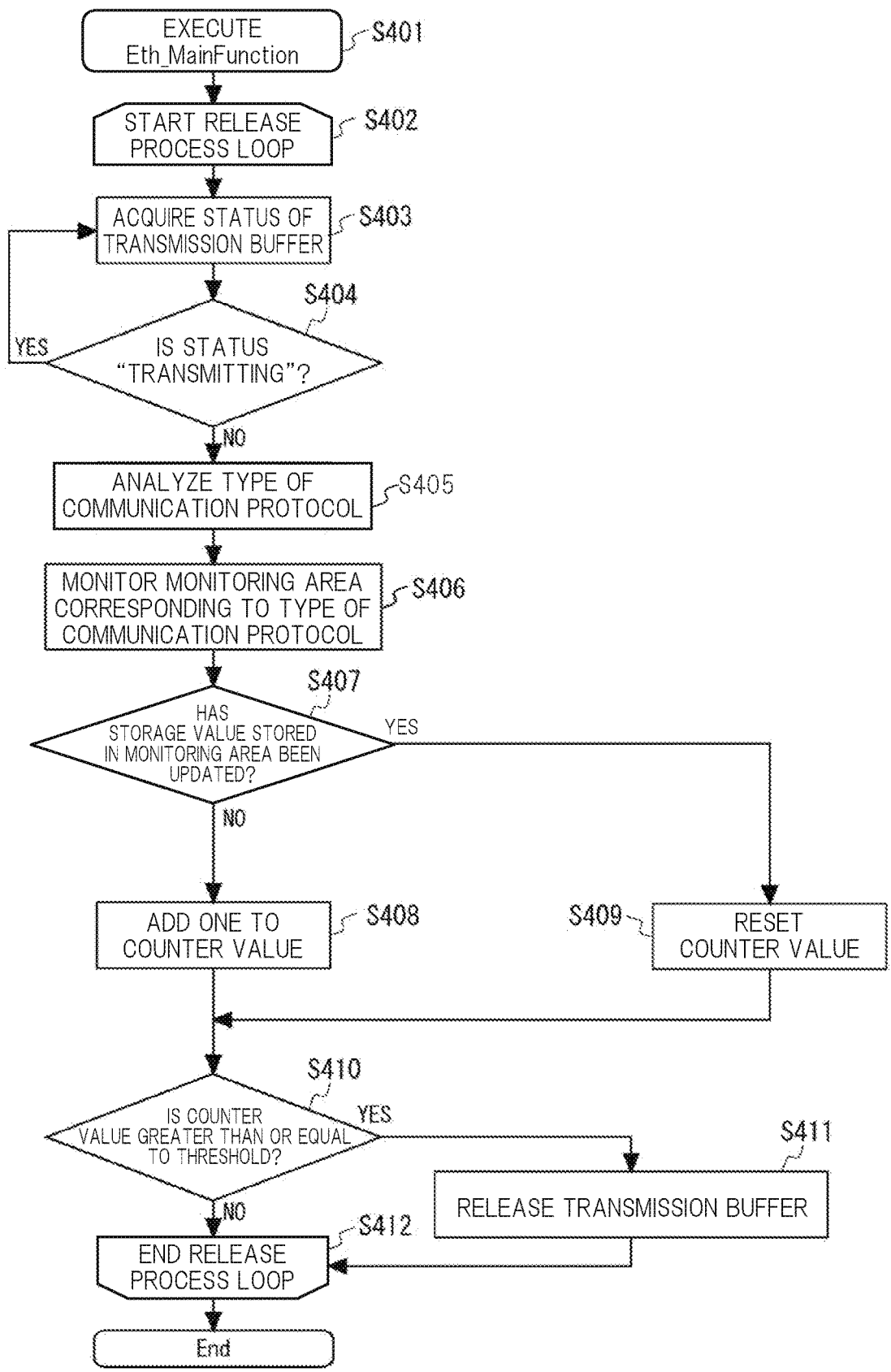
FIG. 9 is a flowchart illustrating an example of a flow of an operation of the communication device according to the first embodiment.

FIG. 9 is a flowchart illustrating details of a flow of an operation of the communication device 100. First, it is assumed that Eth_MainFunction is executed (step S401).

In response to step S401, a process loop of releasing the transmission buffer is started (step S402). The processes in step S403 to step S411 are repeated as many times as the number of secured transmission buffers.

First, the Ethernet driver 31 refers to the memory allocation table 315 and acquires the status 3152 of the transmission buffer (step S403).

Next, the Ethernet driver 31 determines whether the status 3152 is "transmitting" (step S404). When the status 3152 is "transmitting" (YES in step S404), the process returns to step S403 and proceeds to a process for the next transmission buffer.

When the status 3152 is not "transmitting" (NO in step S404), the Ethernet driver 31 analyzes the type of communication protocol to be used (step S405). The communication protocol corresponds to the upper protocol described above. The Ethernet driver 31 may assume that the communication protocol is IP when the communication protocol is unknown. In addition, the Ethernet driver 31 may analyze the type of the communication protocol higher than the IP.

Next, the Ethernet driver 31 monitors a monitoring area corresponding to the type of the communication protocol (step S406). The start address and the size of the monitoring area may be different according to the protocol used.

The Ethernet driver 31 can analyze whether the communication protocol is TCP, UDP, or ICMP, for example, by referring to the protocol number area 81311 in FIG. 7. The Ethernet driver 31 monitors the TCP checksum area when the communication protocol is TCP. The Ethernet driver 31 monitors the UDP checksum area when the communication protocol is UDP. The same applies to ICMP.

Next, the Ethernet driver 31 determines whether the storage value stored in the monitoring area has been updated from the previous value (step S407). In a case where the storage value has been updated (YES in step S407), the Ethernet driver 31 resets the counter value 3153 (step S409). In a case where the storage value has not been updated (NO in step S407), the Ethernet driver 31 adds one to the counter value 3153 (step S408).

Next, the Ethernet driver 31 determines whether the counter value 3153 is greater than or equal to the threshold 3161 (step S410). The threshold 3161 defines a condition for releasing the transmission buffer. The threshold 3161 may be set to an appropriate value by the user application 11.

When the counter value 3153 is greater than or equal to the threshold 3161 (YES in step S410), the Ethernet driver 31 releases the transmission buffer (step S411) and proceeds to step S412. In this case, the Ethernet driver 31 considers that the transmission buffer has been abandoned by the user application 11. When the counter value 3153 is less than the threshold 3161 (NO in step S410), the Ethernet driver 31 proceeds to step S412.

When the processes for all the secured transmission buffers are completed, the Ethernet driver 31 ends the loop (step S412).

According to the first embodiment, the transmission buffer can be released without transmitting a frame, and deterioration of the network bandwidth can be prevented. In addition, the real-time property of the user application can be improved by improving the latency.

In addition, according to the first embodiment, since the secured transmission buffer can be released by a decision by the user, usability can be improved. Specifically, the cancellation in the middle can be executed in step S108 in FIG. 2.

The API parameters defined in AUTOSAR are not changed in the first embodiment. Therefore, the first embodiment is highly implantable and reusable.

The first embodiment is also applicable to a communication technology conforming to the standard other than AUTOSAR. The first embodiment may be applied to any communications technology of a specification in which a user application cannot optionally release a transmission buffer. The communication device according to the first embodiment is not limited to an in-vehicle device.

Although the invention made by the present inventors has been specifically described based on the embodiments, the present invention is not limited to the above embodiments, and it goes without saying that various modifications can be made without departing from the gist of the present invention.

What is claimed is:

1. A communication device comprising:
   at least one memory; and
   at least one processor coupled to the at least one memory, wherein the at least one processor is configured to:
   allocate a transmission buffer for storing a frame to be transmitted, the transmission buffer not being releasable by a user application unless the frame is transmitted from the transmission buffer;
   receive a transmission request from the user application;
   transmit the frame from the transmission buffer in response to the transmission request;
   monitor a storage area within the transmission buffer to determine whether a storage value stored in the storage area has been updated, the storage area being one in which a specific field in an upper protocol header included in payload data of the frame transmitted from the transmission buffer is written, the storage value being updated when the frame is transmitted; and
   release the transmission buffer in a case where the storage value stored in the storage area has not been updated for a certain period of time.

2. The communication device according to claim 1, wherein the specific field includes at least one of a field indicating a protocol number in an IP header, a field indicating a header checksum in the IP header, a field indicating a checksum in a TCP header, a field indicating a checksum in a UDP header, and a field indicating a checksum in an ICMP header.

3. The communication device according to claim 2, wherein the at least one processor monitors a storage area in which a plurality of the specific fields are written.

4. The communication device according to claim 1, wherein the at least one processor is configured to:
   periodically monitor whether the storage value is updated;
   increment a counter value representing a period during which the storage value has not been updated by a certain amount in a case where the storage value has not been updated, and reset the counter value in a case where the storage value has been updated; and
   release the transmission buffer when the counter value is greater than or equal to a threshold.

5. The communication device according to claim 4, wherein the threshold is set by the user application.

6. The communication device according to claim 1, wherein the at least one processor is configured to:
   analyze a type of the upper protocol; and
   monitor the storage area according to a type of the upper protocol.

7. The communication device according to claim 1, wherein the communication device performs communication according to an AUTOSAR (registered trademark) standard.

8. The communication device according to claim 7, wherein the communication device is a gateway electronic control unit (ECU).

9. A release method of a buffer, the release method comprising:
   allocating, using a computer, a transmission buffer for storing a frame to be transmitted, the transmission buffer not being releasable by a user application unless the frame is transmitted from the transmission buffer;
   receiving, by the computer, a transmission request from the user application;
   transmitting, using the computer, a frame from the transmission buffer in response to the transmission request from the user application;
   monitoring, using the computer, a storage area within the transmission buffer to determine whether a storage value stored in the storage area has been updated, the storage area being one in which a specific field in an upper protocol header included in payload data of the frame transmitted from the transmission buffer is written, the storage value being updated when the frame is transmitted; and
   releasing, using the computer, the transmission buffer in a case where the storage value stored in the storage area has not been updated for a certain period of time.

10. A non-transitory computer readable storage medium storing a program for causing a computer to execute a process comprising:
    allocating a transmission buffer for storing a frame to be transmitted, the transmission buffer not being releasable by a user application unless the frame is transmitted from the transmission buffer;
    receiving a transmission request from the user application;
    transmitting the frame form the transmission buffer in response to the transmission request;
    monitoring a storage area within the transmission buffer to determine whether a storage value stored in the storage area has been updated, the storage area being one in which a specific field in an upper protocol header included in payload data of the frame transmitted from the transmission buffer is written, the storage value being updated when the frame is transmitted; and
    releasing the transmission buffer in a case where the storage value stored in the storage area has not been updated for a certain period of time.

* * * * *